United States Patent
Reckdahl et al.

(12) 
(10) Patent No.: US 6,456,907 B1
(45) Date of Patent: Sep. 24, 2002

(54) SYSTEM AND METHOD FOR LIMITING THE EFFECTS OF ACTUATOR SATURATION TO CERTAIN BODY AXES OF A SPACECRAFT

(75) Inventors: Keith Reckdahl, Palo Alto; Xenophon Price, Redwood City, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/493,596

(22) Filed: Jan. 31, 2000

(51) Int. Cl.$^7$ ................................................. B64G 1/24
(52) U.S. Cl. ......................................... 701/13; 244/165
(58) Field of Search ............................ 701/13; 244/164, 244/165, 171

(56) References Cited

U.S. PATENT DOCUMENTS

| | | | | |
|---|---|---|---|---|
| 4,010,921 A | * | 3/1977 | Pistiner et al. | 244/166 |
| 4,767,084 A | * | 8/1988 | Chan et al. | 244/164 |
| 5,058,835 A | * | 10/1991 | Goodzeit et al. | 244/165 |
| 5,279,483 A | * | 1/1994 | Blancke et al. | 244/165 |
| 5,826,829 A | * | 10/1998 | Holmes | 244/165 |
| 6,138,953 A | * | 10/2000 | Noyola et al. | 244/165 |

* cited by examiner

Primary Examiner—Michael J. Zanelli
Assistant Examiner—Eric M. Gibson
(74) Attorney, Agent, or Firm—Kenneth W. Float

(57) ABSTRACT

Systems and methods that limit the effects of actuator saturation to certain body axes of a spacecraft. A plurality of actuators, or momentum wheels, disposed on the spacecraft are oriented non-parallel to x, y, and z axes of the spacecraft. The plurality of actuators each produce torque that is applied to the spacecraft. Outputs of the plurality of actuators or momentum wheels are processed to control the respective actuators or momentum wheels to manage actuator saturation so that saturation does not produce attitude errors about one or more predetermined axes of the spacecraft.

36 Claims, 1 Drawing Sheet

SYSTEM AND METHOD FOR LIMITING THE EFFECTS OF ACTUATOR SATURATION TO CERTAIN BODY AXES OF A SPACECRAFT

BACKGROUND

The present invention relates generally to spacecraft attitude control systems and methods, and more particularly, to systems and methods that limit the effects of actuator saturation to certain body axes of a spacecraft.

Certain spacecraft use three momentum wheels that are respectively oriented parallel to the x axis, y axis, and z axis of a spacecraft. If a requested y-axis torque exceeds the maximum torque output of the y-axis momentum wheel, then the y-axis motor driving the momentum wheel saturates, introducing a y-axis attitude error. Since the x-axis and z-axis motors are orthogonal to the y-axis, they have no immediate effect on the motion of the spacecraft about the y-axis. Therefore, adjusting the x-axis and z-axis torque cannot reduce or prevent the y-axis attitude error.

Therefore. it would be advantageous to have an arrangement of momentum wheels for use on a spacecraft and processing methods that allow actuator saturation to be managed so that saturation does not produce an attitude error about a particular axis.

SUMMARY OF THE INVENTION

The present invention provides for systems and methods that limit the effects of actuator saturation to certain body axes of a spacecraft. The conventional approach of orienting momentum wheels parallel to the respective x axis, y axis, and z axis of the spacecraft is not used in the present invention. In the present invention, the actuators, or momentum wheels, are not oriented parallel to the x, y, and z axes of the spacecraft.

When each of the three momentum wheels are not oriented parallel to the spacecraft axes, each momentum wheel affects the motion about two or more axes of the spacecraft. This orientation of the momentum wheels allows actuator saturation to be managed using methods in accordance with the present invention so that actuator saturation produces no attitude error about any particular axis.

For example, a spacecraft operating with a pitch momentum bias can tolerate roll and yaw torque error much better than it can tolerate pitch torque error. In such a spacecraft, the present invention may be used to ensure that torque errors about the pitch axis are prevented whenever possible, even if this introduces roll or yaw torque errors.

A second example is the case of a satellite which can tolerate more error about the boresight of its antenna than other rotations which move the boresight away from its target. This invention can be used to prevent torque errors orthogonal to the antenna boresight whenever possible, even if this introduces torque errors about the antenna boresight.

An exemplary embodiment of the present invention operates to prevent torque errors about the pitch axis of a spacecraft having a pitch momentum bias. Pitch momentum bias causes stiffness about roll and yaw axes, greatly reducing attitude errors caused by roll torque errors and yaw torque errors. However, since the pitch momentum bias adds no stiffness to the pitch axis, any pitch torque error results in relatively large pitch attitude errors. To prevent these large pitch attitude errors, the present invention is used to prevent wheel torque saturation from causing any pitch torque error. An algorithm is disclosed that is implemented in a processor coupled to each of the momentum wheels to implement this exemplary embodiment.

The present invention may be implemented with an arbitrary number of hierarchical levels. For example, saturation may be managed such that it affects yaw first, then roll, and finally pitch.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
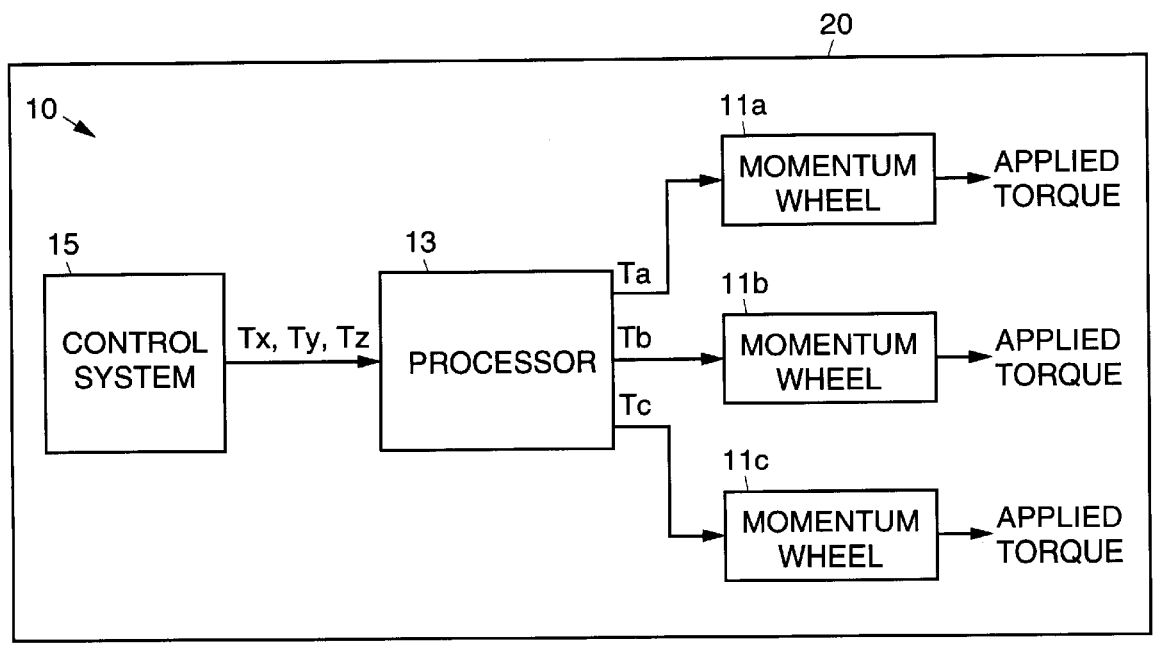
FIG. 1 illustrates an exemplary system in accordance with present invention for limiting the effects of actuator saturation to certain body axes of a spacecraft.

Referring to the drawing figures, FIG. 1 illustrates an exemplary system 10 in accordance with present invention for limiting the effects of actuator saturation to certain body axes of a spacecraft 20. The exemplary system 10 is disposed on a spacecraft 20.

The spacecraft 20 comprises actuators 11a, 11b, 11c, or momentum wheels 11a, 11b, 11c, having inputs that are coupled to a processor 13. The actuators 11a, 11b, 11c, or momentum wheels 11a, 11b, 11c, are not oriented parallel to corresponding axes of the spacecraft 20.

The processor 13 receives requested control torques Tx, Ty, Tz from the control system 15. The processor 13 outputs actuator torques Ta, Tb, Tc to momentum wheels 11a, 11b, 11c, respectively. The processor 13 determines values for actuator torques Ta, Tb, Tc such that the actuators 11a, 11b, 11c impart the requested control torques Tx, Ty, Tz on the spacecraft 20 whenever possible. When actuator torque limits make it impossible for the actuators 11a, 11b, 11c to produce the requested control torques Tx, Ty, Tz, the processor 13 manages the actuator saturation so that saturation does not produce attitude errors about a particular axis of the spacecraft 20. For example, the processor 13 operates to minimize or eliminate torque errors about a pitch axis of the spacecraft 20 for a spacecraft 20 operating with a pitch momentum bias.

Figure 2:
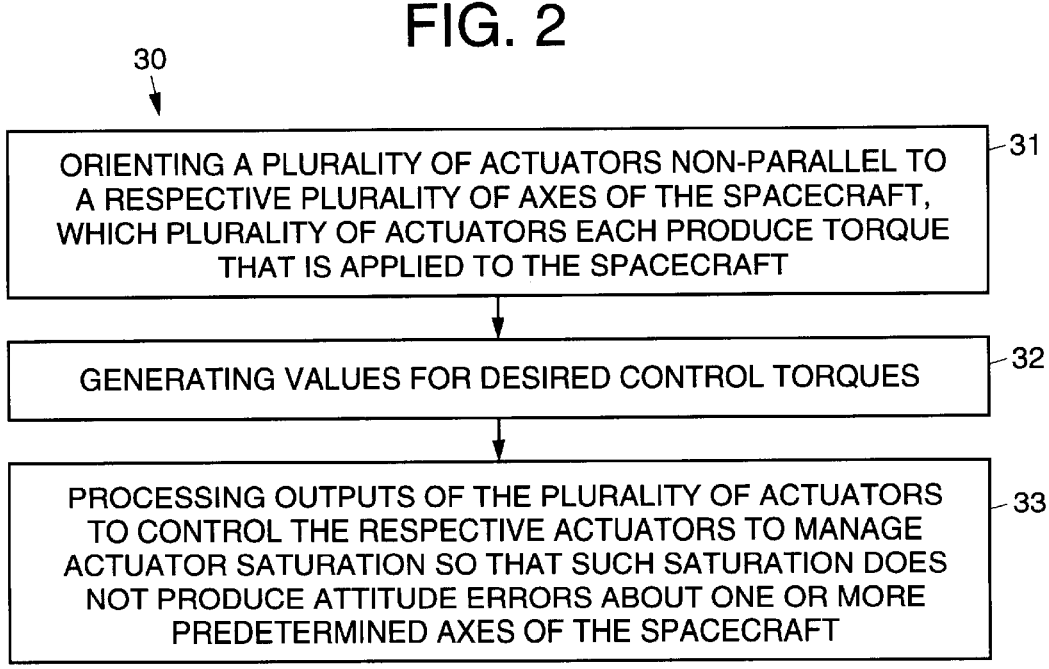
FIG. 2 illustrates an exemplary method in accordance with present invention for limiting the effects of actuator saturation to certain body axes of a spacecraft.

Referring to FIG. 2, it illustrates an exemplary method 30 in accordance with present invention for limiting the effects of actuator saturation to certain body axes of a spacecraft 20. The exemplary method 30 comprises the following steps.

The method 30 orients 31 a plurality of actuators 11a, 11b, 11c non-parallel to a respective plurality of axes of the spacecraft 20. The plurality of actuators 11a, 11b, 11c each produce torque that is applied to the spacecraft 20. A control system 15 generates and outputs 32 requested or desired control torques (Tx, Ty, Tz). A processor 13 processes 33 the requested or desired control torques (Tx, Ty, Tz) and determines that torques values (Ta, Tb, Tc) to be produced by each of the plurality of actuators 11a, 11b, 11c. The outputs (Tx, Ty, Tz) of the control system 15 are processed 33 by the processor 13 to control the respective actuators 11a, 11b, 11c to manage actuator saturation so that such saturation does not produce attitude errors about one or more predetermined axes of the spacecraft 20.

The processing 33 may be configured to manage saturation of the respective actuators 11a, 11b, 11c to prevent torque errors about one or more predetermined axes of the spacecraft. The processing 33 may be configured to manage saturation of the respective actuators 11a, 11b, 11c to prevent force errors along one or more predetermined axes of the spacecraft. The processing 33 may be configured to manage saturation of the respective actuators 11a, 11b, 11c to prevent errors corresponding to a particular generalized coordinate.

In one embodiment, the actuators 11a, 11b, 11c may comprise momentum wheels 11a, 11b, 11c that each produce torque that is applied to the spacecraft 20. In this case, the processing 33 may be configured to manage the respective momentum wheels 11a, 11b, 11c to prevent torque errors about a predetermined axis of the spacecraft In another embodiment, the actuators 11a, 11b, 11c may comprise momentum wheels 11a, 11b, 11c that each produce torque that is applied to the spacecraft 20. In this case, the processing 33 may be configured to manage the respective momentum wheels 11a, 11b, 11c to prevent torque errors about two predetermined axes of the spacecraft.

If the spacecraft 20 has a pitch momentum bias, the processing 33 may be configured to manage the saturation of the momentum wheels 11a, 11b, 11c so that torque errors about the pitch axis are prevented.

In another embodiment, the actuators 11a, 11b, 11c may comprise momentum wheels 11a, 11b, 11c that each produce torque that is applied to the spacecraft 20. In this case, the processing 33 may be configured to manage the respective momentum wheels 11a, 11b, 11c to prevent torque errors about the pitch and roll axes of the spacecraft.

In another embodiment, the actuators 11a, 11b, 11c may comprise momentum wheels 11a, 11b, 11c that each produce torque that is applied to the spacecraft 20. In this case, the processing 33 may be configured to manage the saturation of the respective momentum wheels 11a, 11b, 11c such that producing correct pitch torque has the highest priority, producing correct roll torque has secondary priority, and producing correct yaw torque has the tertiary priority.

The mathematics relating to processing performed in the processor 13 will now be discussed. Define $b_x$, $b_y$, $b_z$ as a set of orthonormal unit vectors parallel to the roll, pitch, and yaw axes of the spacecraft 20. Define $w_1$, $w_2$, $w_3$ as unit vectors parallel to the axes of the three momentum wheels 11a, 11b, 11c. When $\rho_1$, $\rho_2$, $\rho_3$ are defined as the torques produced by the three wheels, the total torque exerted on the spacecraft 20 by the three momentum wheels 11a, 11b, 11c can be written as $$T_{wheel} = \tau_1 w_1 + \tau_2 w_2 + \tau_3 w_3 \quad (1)$$

Define $T_x, T_y, T_z$ as $$T_x \triangleq T_{wheel} b_x$$

$$T_y \triangleq T_{wheel} b_y \quad (2)$$

$$T_z \triangleq T_{wheel} b_z$$

and define a 1×3 matrix $A_1$ and a 2×3 matrix $A_2$ as $$A1 \triangleq [b_y \cdot w_1, b_y \cdot w_2, b_y \cdot w_3] \quad (3)$$

$$A_2 \triangleq \begin{bmatrix} b_x \cdot w_1 & b_x \cdot w_2 & b_x \cdot w_3 \\ b_z \cdot w_1 & b_z \cdot w_2 & b_z \cdot w_3 \end{bmatrix} \quad (4)$$

which allows $T_x$, $T_y$, $T_z$ to be related to $\tau_1, \tau_2, \tau_3$ by $$T_y = A_1 \begin{bmatrix} \tau_1 \\ \tau_2 \\ \tau_3 \end{bmatrix} \quad (5)$$

$$\begin{bmatrix} T_x \\ T_y \end{bmatrix} = A_2 \begin{bmatrix} \tau_1 \\ \tau_2 \\ \tau_3 \end{bmatrix} \quad (6)$$

Define sat to be the torque capacity of each motor (that is, the motors can only produce torques between—sat and sat). Define MaxPitchTorque as the largest pitch torque that can be produced by the three wheels (without regard to the roll/yaw torque produced). This is done by saturating each wheel in a direction that causes its pitch component to be positive. When this maximum positive pitch torque is produced by the wheel torques $\rho_1$=sat$_1$, $\rho_2$=sat$_2$, $\rho_3$=sat$_3$, define a 3×1 matrix $I_1$ as $$I_1 \triangleq \frac{1}{MaxPitchTorque} \begin{bmatrix} sat1 \\ sat2 \\ sat3 \end{bmatrix} \quad (7)$$

Construct a 3×2 matrix $V_1$ such that its two columns form an orthonormal basis for the row nullspace of $A_1$. Then define the 3×2 matrix $I_2$ as $$I_2 = V_1(A_2 V_1)^+ \quad (8)$$

where the +superscript indicates a pseudoinverse which minimizes the 2-norm residual. Multiplying $I_2$ by roll/yaw torque produces a set of wheel torques that produce the desired roll/yaw torque while producing no pitch torque. Instead of using $I_2$ directly, it is more efficient to define a 3×3 matrix $$I_3 \triangleq I_2 \left( \begin{bmatrix} 1 & 0 & 0 \\ 0 & 0 & 1 \end{bmatrix} - A_2 I_1 [0 \ 1 \ 0] \right) \quad (9)$$

When the predetermined axis is remains fixed in the spacecraft, the matrices $I_1$ and $I_3$ are constants and thus can be calculated once during spacecraft design and then stored in spacecraft memory. When the predetermined axis moves relative to the spacecraft, the matrices $I_1$ and $I_3$ may be time-varying. Once $I_1$ and $I_3$ have been calculated, the wheel torques $\rho_1$, $\rho_2$, $\rho_3$ corresponding to a desired set of body torques $T_x$, $T_y$, $T_z$ can be calculated by the following algorithm.

% - - -
% The following algorithm uses the scalar input Tx,Ty,Tz and produces
% wheel torques Tau (3×1 matrix). The following constants are used
% sat, MaxPitchTorque, epsilon (scalars)
% I1(3×1)
% I3 (3×3)
% - - -
if (abs(Ty)>MaxPitchTorque)
   % - - -
   % Requested pitch torque is too large. Instead, produce maximum pitch torque.
   % Note that this is NOT a pure pitch torque. The ability to produce a pure pitch
   % torque is sacrificed in order to produce the largest possible pitch torque.

```
% - - -
Tau=I1*MaxPitchTorque*sign(Ty);
else
  % - - -
  % Calculate a set of wheel torques that produce the
    desired pitch torque, with
  % no regard to roll/yaw torques. That is, this is not a pure
    pitch torque.
  % - - -
  Tau1=I1*Ty;
  % - - -
  % Determine the delta wheel torques that produce the
    correct roll-yaw torques
  % while not affecting the pitch torque.
  %
  % I2*[a;b] produces a set of wheel torques that produce
    body torques Tx=a,
  % Ty=0, Tz=b. Since these wheel torques do not affect Ty,
    they can be added
  % to Tau1 to determine wheel torques that produce the
    desired Tx and Tz.
  % Since the Tau1 wheel torques produce roll/yav torques
    A2*Tau1, the total
  % roll/yaw torque adjustment is [Tx;Tz]-A2*Tau1) which
    requires wheel
  % torques dTau=I2*([Tx;Tz]-A2*Tau1) which is the
    same as
  % dTau=I3*[Tx;Ty;Tz]
  % - - -
  dTau=I3*[Tx;Ty;Tz]
  % - - -
  % Without saturation (Tau=Tau1+dTau) produces the
    desired body torques.
  % Note that Tau1 produces roll. Pitch, and yaw while
    dTau produces only roll
  % and yaw. However, saturation may make it impossible
    to produce the entire
  % Tau. To prevent this saturation from causing pitch-
    torque error, saturate the
  % motors such that the saturation only affects roll-yaw
    torque. Since dTau
  % affects only roll-yaw torque, subtract enough dTau to
    prevent saturation.
  %
  % The following code determines the maximum value of
    X Such that the wheel
  % torques (Tau=Tau1+X*dTau) do not cause saturation.
    The variable
  % epsilon is a positive number that is "small" compared
    sat. For example,
  % a good value for sat would be slightly larger than the
    machine precision.
  % - - -
  K=1;
  for i=1:3.
    if (abs(dTau(i))>epsilon
      newK=(sign(dTau(i))*sat-Tau1(i)/dTau(i);
      K=min(K, newK);
    end
  end
  % - - -
  % Tau is a 3×1 matrix containing the three wheel torque
    tau1,tau2,tau3
  % if (K<1) then Pitch torque satisfied, roll-yaw torque in
    not satisfied
  % if (K=1) then Roll, Pitch. Yaw torque all satisfied
  % - - -
  Tau=Tau1+K*dTau;
end
```

Thus, methods that manages actuator saturation in a manner that does not produce any attitude error about a particular axis have been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A system for limiting the effects of actuator saturation to certain body axes of a spacecraft, comprising:
   a plurality of actuators disposed on the spacecraft that are not oriented parallel to a respective plurality of axes of the spacecraft, and that each produce torque that is applied to the spacecraft;
   a control system that outputs desired control torques; and
   a processor coupled to the control system and actuators for processing the desired control torque outputs of the control system and calculating inputs for actuators to manage actuator saturation to prevent torque errors about one or more predetermined axes of the spacecraft so that saturation does not produce attitude errors about one or more predetermined axes of the spacecraft.

2. The system recited in claim 1 wherein the actuators comprise momentum wheels that each produce torque that is applied to the spacecraft, and wherein the processor manages the saturation of the respective momentum wheels to prevent torque errors about a predetermined axis of the spacecraft.

3. The system recited in claim 1 wherein the actuators comprise momentum wheels that each produce torque that is applied to the spacecraft, and wherein the processor manages the saturation of the respective momentum wheels to prevent torque errors about two predetermined axes of the spacecraft.

4. The system recited in claim 3 wherein the spacecraft has a pitch momentum bias, and wherein the processor manages the saturation of the momentum wheels such that torque errors about the pitch axis are prevented.

5. The system recited in claim 1 wherein the actuators comprise momentum wheels that each produce torque that is applied to the spacecraft, and wherein the processor manages the saturation of the respective momentum wheels to prevent torque errors about the pitch and roll axes of the spacecraft.

6. The system recited in claim 1 wherein the actuators comprise momentum wheels that each produce torque that is applied to the spacecraft, and wherein the processor manages the saturation of the respective momentum wheels such that producing correct pitch torque has the highest priority producing correct roll torque has secondary priority, and producing correct yaw torque has the tertiary priority.

7. A method for limiting the effects of actuator saturation to certain body axes of a spacecraft, comprising:
   orienting a plurality of actuators non-parallel to a respective plurality of axes of the spacecraft, which plurality of actuators each produce torque that is applied to the spacecraft;

generating values for desired control torques; and processing the desired control torques to produce inputs for the actuators that manage actuator saturation to prevent torque errors about one or more predetermined axes of the spacecraft so that saturation does not produce attitude errors about one or more predetermined axes of the spacecraft.

8. The method recited in claim 7 wherein the actuators comprise momentum wheels that each produce torque that is applied to the spacecraft, and wherein the processing manages the saturation of the respective momentum wheels to prevent torque errors about a predetermined axis of the spacecraft.

9. The method recited in claim 7 wherein the actuators comprise momentum wheels that each produce torque that is applied to the spacecraft, and wherein the processing manages the saturation of the respective momentum wheels to prevent torque errors about two predetermined axes of the spacecraft.

10. The method recited in claim 9 wherein the spacecraft has a pitch momentum bias, and wherein the processing manages the saturation of the momentum wheels such that torque errors about the pitch axis are prevented.

11. The method recited in claim 7 wherein the actuators comprise momentum wheels that each produce torque that is applied to the spacecraft, and wherein the processing manages the saturation of the respective momentum wheels to prevent torque errors about the pitch and roll axes of the spacecraft.

12. The method recited in claim 7 wherein the actuators comprise momentum wheels that each produce torque that is applied to the spacecraft, and wherein the processing manages the saturation of the respective momentum wheels such that producing correct pitch torque has the highest priority, producing correct roll torque has secondary priority, and producing correct yaw torque has the tertiary priority.

13. A system for limiting the effects of actuator saturation to certain body axes of a spacecraft, comprising:

a plurality of actuators disposed on the spacecraft that are not oriented parallel to a respective plurality of axes of the spacecraft, and that each produce torque that is applied to the spacecraft;

a control system that outputs desired control torques; and a processor coupled to the control system and actuators for processing the desired control torque outputs of the control system and calculating inputs for actuators to manage actuator saturation to prevent force errors along one or more predetermined axes of the spacecraft so that saturation does not produce attitude errors about one or more predetermined axes of the spacecraft.

14. The system recited in claim 13 wherein the actuators comprise momentum wheels that each produce torque that is applied to the spacecraft, and wherein the processor manages the saturation of the respective momentum wheels to prevent torque errors about a predetermined axis of the spacecraft.

15. The system recited in claim 13 wherein the actuators comprise momentum wheels that each produce torque that is applied to the spacecraft, and wherein the processor manages the saturation of the respective momentum wheels to prevent torque errors about two predetermined axes of the spacecraft.

16. The system recited in claim 13 wherein the spacecraft has a pitch momentum bias, and wherein the processor manages the saturation of the momentum wheels such that torque errors about the pitch axis are prevented.

17. The system recited in claim 13 wherein the actuators comprise momentum wheels that each produce torque that is applied to the spacecraft, and wherein the processor manages the saturation of the respective momentum wheels to prevent torque errors about the pitch and roll axes of the spacecraft.

18. The system recited in claim 13 wherein the actuators comprise momentum wheels that each produce torque that is applied to the spacecraft, and wherein the processor manages the saturation of the respective momentum wheels such that producing correct pitch torque has the highest priority, producing correct roll torque has secondary priority, and producing correct yaw torque has the tertiary priority.

19. A method for limiting the effects of actuator saturation to certain body axes of a spacecraft, comprising:

orienting a plurality of actuators non-parallel to a respective plurality of axes of the spacecraft, which plurality of actuators each produce torque that is applied to the spacecraft;

generating values for desired control torques; and processing the desired control torques to produce inputs for the actuators that manage actuator saturation to prevent force errors along one or more predetermined axes of the spacecraft so that saturation does not produce attitude errors about one or more predetermined axes of the spacecraft.

20. The method recited in claim 19 wherein the actuators comprise momentum wheels that each produce torque that is applied to the spacecraft, and wherein the processing manages the saturation of the respective momentum wheels to prevent torque errors about a predetermined axis of the spacecraft.

21. The method recited in claim 19 wherein the actuators comprise momentum wheels that each produce torque that is applied to the spacecraft, and wherein the processing manages the saturation of the respective momentum wheels to prevent torque errors about two predetermined axes of the spacecraft.

22. The method recited in claim 19 wherein the spacecraft has a pitch momentum bias, and wherein the processing manages the saturation of the momentum wheels such that torque errors about the pitch axis are prevented.

23. The method recited in claim 19 wherein the actuators comprise momentum wheels that each produce torque that is applied to the spacecraft, and wherein the processing manages the saturation of the respective momentum wheels to prevent torque errors about the pitch and roll axes of the spacecraft.

24. The method recited in claim 19 wherein the actuators comprise momentum wheels that each produce torque that is applied to the spacecraft, and wherein the processing manages the saturation of the respective momentum wheels such that producing correct pitch torque has the highest priority, producing correct roll torque has secondary priority, and producing correct yaw torque has the tertiary priority.

25. A system for limiting the effects of actuator saturation to certain body axes of a spacecraft, comprising:

a plurality of actuators disposed on the spacecraft that are not oriented parallel to a respective plurality of axes of the spacecraft, and that each produce torque that is applied to the spacecraft;

a control system that outputs desired control torques; and a processor coupled to the control system and actuators for processing the desired control torque outputs of the control system and calculating inputs for actuators to manage actuator saturation to prevent errors corresponding to a particular generalized coordinate so that saturation does not produce attitude errors about one or more predetermined axes of the spacecraft.

26. The system recited in claim 25 wherein the actuators comprise momentum wheels that each produce torque that is applied to the spacecraft, and wherein the processor manages the saturation of the respective momentum wheels to prevent torque errors about a predetermined axis of the spacecraft.

27. The system recited in claim 25 wherein the actuators comprise momentum wheels that each produce torque that is applied to the spacecraft, and wherein the processor manages the saturation of the respective momentum wheels to prevent torque errors about two predetermined axes of the spacecraft.

28. The system recited in claim 25 wherein the spacecraft has a pitch momentum bias, and wherein the processor manages the saturation of the momentum wheels such that torque errors about the pitch axis are prevented.

29. The system recited in claim 25 wherein the actuators comprise momentum wheels that each produce torque that is applied to the spacecraft, and wherein the processor manages the saturation of the respective momentum wheels to prevent torque errors about the pitch and roll axes of the spacecraft.

30. The system recited in claim 25 wherein the actuators comprise momentum wheels that each produce torque that is applied to the spacecraft, and wherein the processor manages the saturation of the respective momentum wheels such that producing correct pitch torque has the highest priority, producing correct roll torque has secondary priority, and producing correct yaw torque has the tertiary priority.

31. A method for limiting the effects of actuator saturation to certain body axes of a spacecraft, comprising:

orienting a plurality of actuators non-parallel to a respective plurality of axes of the spacecraft, which plurality of actuators each produce torque that is applied to the spacecraft;

generating values for desired control torques; and processing the desired control torques to produce inputs for the actuators that manage actuator saturation to prevent errors corresponding to a particular generalized coordinate so that saturation does not produce attitude errors about one or more predetermined axes of the spacecraft.

32. The method recited in claim 31 wherein the actuators comprise momentum wheels that each produce torque that is applied to the spacecraft, and wherein the processing manages the saturation of the respective momentum wheels to prevent torque errors about a predetermined axis of the spacecraft.

33. The method recited in claim 31 wherein the actuators comprise momentum wheels that each produce torque that is applied to the spacecraft, and wherein the processing manages the saturation of the respective momentum wheels to prevent torque errors about two predetermined axes of the spacecraft.

34. The method recited in claim 31 wherein the spacecraft has a pitch momentum bias, and wherein the processing manages the saturation of the momentum wheels such that torque errors about the pitch axis are prevented.

35. The method recited in claim 31 wherein the actuators comprise momentum wheels that each produce torque that is applied to the spacecraft, and wherein the processing manages the saturation of the respective momentum wheels to prevent torque errors about the pitch and roll axes of the spacecraft.

36. The method recited in claim 31 wherein the actuators comprise momentum wheels that each produce torque that is applied to the spacecraft, and wherein the processing manages the saturation of the respective momentum wheels such that producing correct pitch torque has the highest priority, producing correct roll torque has secondary priority, and producing correct yaw torque has the tertiary priority.

* * * * *